United States Patent [19]

Bares

[11] Patent Number: 5,317,373
[45] Date of Patent: May 31, 1994

[54] METHOD AND APPARATUS FOR USER CUSTOMIZED COLORANTS IN AN ELECTROPHOTOGRAPHIC PRINTING MACHINE

[75] Inventor: Jan Bares, Webster, N.Y.

[73] Assignee: Xerox Corporation, Stamford, Conn.

[21] Appl. No.: 996,416

[22] Filed: Dec. 23, 1992

[51] Int. Cl.⁵ .................................. G03G 15/01
[52] U.S. Cl. ........................ 355/326 R; 346/157
[58] Field of Search ............... 355/200, 214, 326, 327, 355/328; 346/157, 160

[56] References Cited

U.S. PATENT DOCUMENTS

| | | | |
|---|---|---|---|
| 3,702,483 | 11/1972 | Fantuzzo | 355/327 X |
| 4,078,929 | 3/1978 | Gundlach | 96/1.2 |
| 4,731,634 | 3/1988 | Stark | 355/3 |
| 4,853,738 | 8/1989 | Rushing | 355/327 |
| 4,903,048 | 2/1990 | Harrington | 346/157 |
| 4,992,828 | 2/1991 | Liston | 355/202 |
| 4,998,144 | 3/1991 | Karn | 355/326 |
| 5,155,541 | 10/1992 | Loce et al. | 355/328 |
| 5,194,905 | 3/1993 | Brewington | 355/326 |
| 5,221,954 | 6/1993 | Harris | 355/327 |
| 5,223,906 | 6/1993 | Harris | 355/326 |

FOREIGN PATENT DOCUMENTS 63-254469 10/1988 Japan .

*Primary Examiner*—Fred L. Braun

[57] ABSTRACT

An electrophotographic printing machine, of the type having a photoconductive surface on which a developed image is formed for producing a plural color image on a sheet substrate, includes mechanisms for forming a developed image on the photoconductive surface by attracting developer material of a plurality of colors to the photoconductive surface. The machine further provides apparatus for adjusting the forming mechanisms so as to change the quantity of at least one of the plurality of colored developer materials attracted to the photoconductive surface so that the quantity of the respective developer materials constituting the image produced on the substrate is varied. Finally, a device for storing and applying electronic signals corresponding to selected adjustments of the adjusting apparatus is provided so that selected colors are repeatable.

5 Claims, 2 Drawing Sheets

METHOD AND APPARATUS FOR USER CUSTOMIZED COLORANTS IN AN ELECTROPHOTOGRAPHIC PRINTING MACHINE

This invention relates generally to the rendering of latent electrostatic images visible using multiple colors of toner or developer material and, more particularly, to rendering such latent electrostatic images visible in user customized colors in electrophotographic printing machines.

The following patents are hereby incorporated within this application by reference thereto: U.S. Pat. No. 4,903,048 to Harrington issued Feb. 20, 1990; U.S. Pat. No. 4,731,634 to Stark issued: Mar. 15, 1988; and U.S. Pat. No. 4,078,929 to Gundlach issued Mar. 14, 1978.

BACKGROUND OF THE INVENTION

Modern business and graphic needs require reproduction and printing of specific colors in prints produced. For example, business entities increasingly use specific colors to act as identifiers. Specified colors on prints produced by full color electrophotographic printing machines are well known. In fact, faithful color reproduction in full color machines has become essential, as failure of such faithful reproduction of color is extremely noticeable and degrades the utility of the device.

As is well known in the art of printers such as those employing xerographic principles of operation, an electrostatic latent image is formed on a surface and is developed by passing triboelectrically charged developer material or toner proximate the surface so that charged developer material is retained on the surface according to the charge level of the latent image. In the devices of the type to which this invention relates, the latent image on the charge retentive surface formed has three (and often more) distinct levels of charge thereon. The art of xerography has advanced so that multicolor images can be developed and processed substantially concurrently, and these devices take two generalized forms, full process color and highlight colors.

Generally, full process color electrophotographic printers expose a series of images which are separately developed at either separate times and/or at different places. In any event, the separate images are merged to form a composite developed image. Customization of colors used in such devices has involved signal processing techniques in the processing of signals which are used to generate the latent images which form the composite image so that the final composite image has the desired or customized color.

Highlight color printing machines generally operate either by exposing a single image which has varying charge levels therein to develop different colors or by similar methods to full process color machines where images are merged to form a composite image. However, in highlight color devices, which do not provide full process color, customized colors have heretofore been provided in some cases by or with the provision of such color developer material. That is, the enablement of users of devices for developing electrostatic images on charge retentive surfaces in a user desired color in these devices was through the use of developer material which was of the desired color. Other techniques such as gray scaling methods have also been used to obtain results which provide a differentiation in the colors of the images produced such as that disclosed in U.S. Pat. No. 4,903,048. Multi-level highlight color printing machines of the type described in U.S. Pat. No. 4,731,634 to Stark permit the overlapping of certain developer materials to achieve a blended color of two developer materials using a highlight color printing machine also of the type to which this invention relates.

Customized colors specified by the users have been a major concern both of marketers and manufacturers of electrophotographic printers, as users thereof have demanded them. Various methods, as described above, as well as others have been employed to achieve such results. However, these methods and the apparatus used to practice these methods have not always been entirely successful, reliable, or relatively inexpensive. Thus, there exists a need for a relatively inexpensive and simple method and means for operators of electrophotographic printing machines to achieve customization of colors.

The following patents may disclose pertinent information relating to the present invention:

U.S. Pat. No. 4,731,634
Patentee: Stark
Issued: Mar. 15, 1988

U.S. Pat. No. 4,078,929
Patentee: Gundlach
Issued: Mar. 14, 1978

U.S. Pat. No. 4,903,048
Patentee: Harrington
Issued: Feb. 20, 1990

U.S. Pat. No. 4,992,828
Patentee: Liston
Issued: Feb. 12, 1991

U.S. Pat. No. 4,853,738
Patentee: Rushing
Issued: Aug. 1, 1989

U.S. Pat. No. 4,998,144
Patentee: Karn
Issued: Mar. 5, 1991

Japanese Application No. 63-254469
Applicant: Nakamura
Published: Oct. 21, 1988

The relevant portions of the foregoing disclosures may be briefly summarized as follows:

U.S. Pat. No. 4,731,634 to Stark is incorporated herein by reference. This patent discloses a method and apparatus rendering latent electrostatic images visible using multiple colors of dye toner or developer through a single pass system.

U.S. Pat. No. 4,078,929 to Gundlach discloses an apparatus for rendering tri-level electrostatic images visible using plural colors of developer material through a single pass system.

U.S. Pat. No. 4,903,048 to Harrington discloses a method for arranging pixels of two colors produced by a highlight color printer to enable apparent shading of produced images on a third color substrate.

U.S. Pat. No. 4,992,828 to Liston discloses a method for changing the input to the controller to change the output imaging through use of a digitizer to select certain areas of the output document to be specially edited.

U.S. Pat. No. 4,853,738 to Rushing discloses an apparatus for automatic setup and/or maintenance of process control parameters. In this manner, it provides for a system which is automated to produce images with good color, balance, fidelity and tonal reproduction. The patent is primarily directed to controlling process parameters and adjustments thereof to provide color and density shifts at various known averages of human visual sensitivities to density and color shifts at a variety of levels.

U.S. Pat. No. 4,998,144 to Karn discloses a color copier which receives a color palate representing the plurality of colors flexible by an operator to produce reproductions. The color is selected by a series of electrical data pulses which is stored and can be compiled by the central processing unit to the image forming apparatus during any copying procedure.

Japanese Laid open application No. 63-254469 discloses a bar coding of colors available for copying. The operator selects the combination of colors to be adjusted from a bar coded chart and transfers the data to the copier by reading or tracing the bar code for such color. Thus, the selected colors can be executed exactly.

Thus, there has been a need and desire for users of color, both highlight color printers and reproducers of documents, for a device which produce specified and repeatable colors as desired. For example, the most important case may be where a company's logo or trademark is used and needs to be used in both a color and size format, as appropriately designated by corporate standards. Further, there are many other documents where both colors shading and tinting serve as identifiers and informational sources as well as providing pictorially appropriate images and senses. Thus, whenever such documents are created electronically, there is a need to identify and assign not only colors to these documents but to the particular portions of the documents. While such assignment procedures and rules are well known parts of electronics in document creation, the identification procedure of the exact color shade desired and user selection is not obvious and its combination with such procedure and enablers has been needed.

According to one aspect of the present invention, there is provided an electrophotographic printing machine of the type having a photoconductive surface on which a developed image is formed for producing a plural color image on a sheet substrate. This printing machine comprises means for forming a developed image on the photoconductive surface by attracting a plurality of developer materials to the photoconductive surface with each developer material being of a different color, means for adjusting the forming means so as to change the quantity of one of the plurality of developer materials attracted to the photoconductive surface so as to vary the relative quantity of the developer materials producing the developed image, and means, responsive to the adjusting means, for storing electronic signals corresponding to selected adjustments of the adjusting means. The adjusting means may comprise a user interface responsive to user command signals for adjusting said forming means, and the forming means may comprise an image generating means for recording a latent image on the photoconductive surface, which can include a raster output scanner for generating multiple output levels, said adjusting means being coupled to said raster output scanner, to adjust the relative output levels of said raster output scanner. The forming means can also include image developing means for developing the latent image recorded on the photoconductive surface, which can include a plurality of developer units with each developer unit having different color developer material. The developer units of this aspect of the invention can also be electrically biased to various levels, said adjusting means adjusting the relative bias levels on said developer units so as to adjust the attractive force between the developer material in said developer unit and the latent image. The forming means may also further include means for charging the photoconductive surface wherein the adjusting means adjust the charging means so as to change the level of charge applied to the surface by the charging means.

According to another aspect of the invention, there is provided a method of printing sheets having user customized colors in an electrophotographic printing machine including a photoconductive member. The method comprising the steps of: forming a developed image on the photoconductive member by attracting a plurality of developer material to the photoconductive member with each developer material being of a different color, adjusting an apparatus employed in said forming step so as to change the quantity of one of the plurality of developer materials attracted to the photoconductive member so as to vary the color of the image produced on the sheets, storing electronic signals corresponding to selected adjustments made to the apparatus in the adjusting step; and applying subsequently selected signals stored in said storing step to the apparatus so that selected colors are replicable. The forming step can also include imaging the photoconductive member with a raster output scanner having plural output levels to form a plural level latent image and wherein said adjusting step comprises varying the relative output levels of the raster output scanner and/or developing the latent image with developer material of a plurality of colors from an electrically biased developer housings. The forming step can also comprise imaging the photoconductive member with a ROS having plural output levels to form a plural level latent image and wherein said adjusting step comprises varying the relative output levels of the ROS.

According to yet another aspect of the invention, there is provided a color printer for printing copies in operator selected colors, which comprises an image forming means for image-wise exposing a insulative surface to record a latent image thereon having a plurality of differing potential levels thereon, a plurality of electrically biased developer units for housing and delivering electrically charged developer material of a plurality of colors to develop the latent image recorded on the photoconductive insulative surface, an operator interface including means for selectively adjusting the relative bias levels on the developer units and means for selectively adjusting the image forming means to vary the relative differences in the potential levels of the latent image, and memory means for storing a series of electrical data signals representing the electrical bias and the potential levels for subsequent reuse.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

BRIEF DESCRIPTION OF THE DRAWINGS

Other features of the present invention will become apparent as the following description proceeds and upon reference to the drawings, in which.

For a general understanding of the illustrative electrophotographic printing machine incorporating the features of the present invention therein, reference is made to the drawings. In the drawings, like reference numerals have been used throughout to designate identical elements.

DETAILED DESCRIPTION OF THE PREFERRED EMBODIMENT

Figure 1:
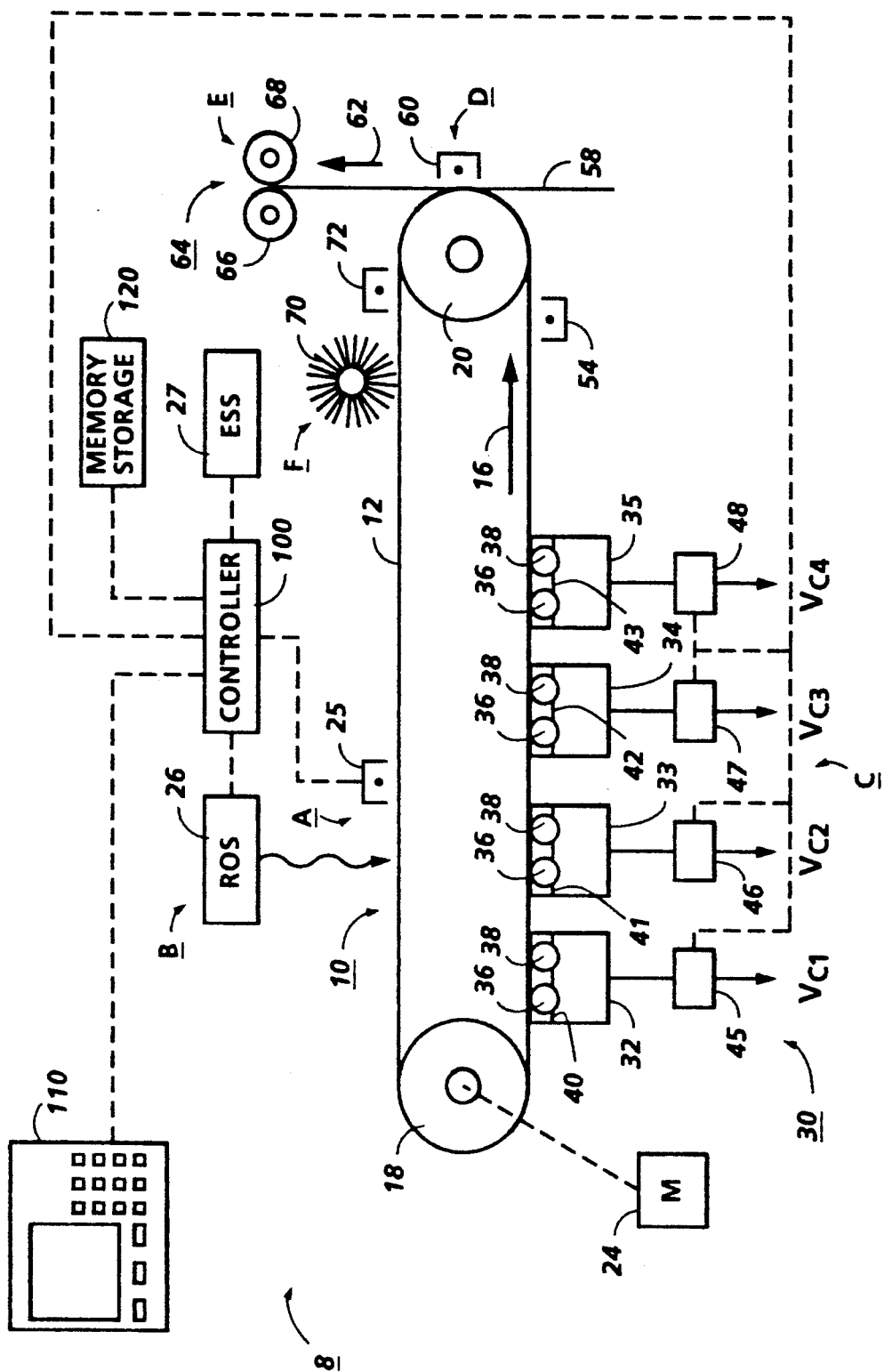
FIG. 1 is a schematic elevational view of an electrophotographic printing machine which includes the features of the present invention.

FIG. 1 schematically depicts the various components of an illustrative electrophotographic printing machine 8 incorporating the present invention therein. The electrophotographic printing machine of FIG. 1 employs a belt 10, i.e. a charge retentive member, having a photoconductive surface 12 deposited on a conductive substrate. Preferably, the photoconductive surface is made from a selenium alloy with the conductive substrate being made preferably from an electrically grounded aluminum alloy. Belt 10 moves in the direction of arrow 16 to advance successive portions thereof sequentially through the various processing stations disposed about the path of movement thereof. Belt 10 is entrained about a tensioning roller 18 and a drive roller 20. Motor 24 rotates roller 20 to advance belt 10 in the direction of arrow 16. Roller 20 is coupled to motor 24 by suitable means such as a belt drive.

Initially successive portions of belt 10 pass through charging station A. At charging station A, a corona generating device, indicated generally by the reference numeral corona generating device 25, charges the belt 10 to a high uniform positive or negative potential. Preferably the charging is to a negative potential. Next, the charged portions of the photoconductive surface are advanced through exposure station B. At exposure station B, the uniformly charged photoconductive surface or charge retentive surface is exposed to a laser based output scanning device 26 which causes the charge retentive surface to be selectively discharged in accordance with the output from the scanning device. Preferably, the scanning device is a five power level laser Raster Output Scanner (ROS), although aspects of this invention can be used with a three or more level ROS. Alternatively, the ROS could be replaced by a conventional xerographic exposure device, as used and described in U.S. Pat. No. 4,078,929, incorporated by reference herein. The ROS 26 of this machine 8 is driven by imaging or video signals from an electronic signal source unit 27 (ESS), which can be or include a computer, an electronic scanning device and the like.

The photoconductive surface 12 of the belt 10, which is initially charged to a high charge potential (the first potential), is preferably discharged image-wise to a second potential in the background (white) image areas, discharged to a third potential near zero or ground potential in the first highlight color areas (e.g., cyan, yellow and magenta) to a fourth potential between the third potential and the second potential in the second highlight color areas (e.g., cyan and yellow), and discharged to a fifth potential between the fourth potential and the second potential in the third highlight color area (e.g., yellow).

At development station C, a magnetic brush development system, indicated generally by the reference numeral 30 advances developer materials into contact with the electrostatic latent images. The development system 30 comprises first, second, third and fourth developer units 32, 33, 34 and 35. Preferably, each of the magnetic brush developer units includes a pair of magnetic brush developer rollers 36 and 38 mounted in each of the housings. The developer housing 32 contains toner 40 of preferably the first color toner material (e.g., magenta). Developer housing 33 contains toner material 41 of preferably the second color toner material (e.g., cyan), and the developer housing 34 contains toner material 42 of the preferable third color toner material (e.g., yellow). Finally, the developer housing 35 contains toner material of the fourth color toner material (e.g., black). Each pair of rollers 36 and 38 advances its respective developer material into contact with the latent image. Appropriate developer housing biasing ($V_{c1}$ for housing 32, $V_{c2}$ for housing 33, $V_{c3}$ for housing 34 and $V_{c4}$ for housing 35) is accomplished via power supplies 45, 46, 47, and 48 electrically connected to respective developer units 32, 33, 34, and 35.

Color discrimination in the development of the electrostatic latent image is achieved by moving the latent image recorded on the photoconductive surface past the developer units 32, 33, 34 and 35 in a single pass with the housings of the developer units electrically biased to voltages which are offset from the background voltage, the direction of offset depending on the polarity of toner in the housing.

The first developer unit 32, in the direction of movement of belt 10 as indicated by arrow 16, develops the third discharged image areas of the photoconductive surface. This developer unit 32 contains, for example, magenta developer material 40 having triboelectric properties such that the magenta toner is driven to the lowest potential discharged image areas of the latent image by the electrostatic field between the photoconductive surface and the electrically biased developer rolls. Likewise, the second developer unit 33, in the direction of movement of belt 10 as indicated by arrow 16, develops the lower charged image areas of the latent images including the third and fourth potential areas. This developer unit 33 contains, for example, cyan developer material 41 having a triboelectric charge such that cyan toner is urged towards charged areas of the latent image by the electrostatic field existing between the photoconductive surface and the electrically biased developer rolls in the second developer unit.

Further, the third developer unit 34, in the direction of movement of belt 10 as indicated by arrow 16, develops the three lower charged image areas of the latent image corresponding to the fifth potential, as well as, the third and fourth potential areas. This developer unit 34, contains yellow developer, for example, material 42. The developer material 42 has a triboelectric charge such that the yellow toner is urged towards charged areas of the latent image by the electrostatic field existing between the photoconductive surface and the electrically biased developer rolls in the second developer unit.

Conversely, the fourth developer unit 35, again in the direction of the belt as indicated by arrow 16, contains black developer, for example, material 43, having a triboelectric charge preferably opposite that of the developer materials 40, 41, and 42 so that the black toner is urged towards highly charged areas of the latent image by the electrostatic field existing between the photoconductive surface and the electrically biased developer rolls in the fourth developer unit 35. It will be understood that developer units 32, 33, 34 and 35 include augers for mixing and charging the developer material and may also include known bead removal devices for removing unwanted developer material from the surface 12 as it passes.

Because the composite image developed on the photoreceptor consists of both positive and negative toner, a negative pre-transfer corona generating device 54 is provided to condition the toner for effective transfer to a substrate using positive corona discharge. It will also be understood that an air knife and/or other pre-transfer cleaning apparatus may be positioned along the belt 10 between the developer station C and the transfer station D to remove undesirable materials from the belt and the area adjacent the belt.

A sheet of support material 58 is moved into contact with the toner image at transfer station D. The sheet of support material is advanced to transfer station D by conventional sheet feeding apparatus, not shown. Preferably, the sheet feeding apparatus includes a feed roll contacting the uppermost sheet of a stack of copy sheets. Feed rolls rotate so as to advance the uppermost sheet from stack into a chute which directs the advancing sheet of support material into contact with the photoconductive surface of belt 10 in a timed sequence so that the toner powder image developed thereon contacts the advancing sheet of support material at transfer station D.

Transfer station D includes a corona generating device 60 which sprays ions of a suitable polarity onto the backside of sheet 58. This attracts substantially simultaneously the black and non-black portions of the toner powder image from the belt 10 to sheet 58. After transfer, the sheet continues to move, in the direction of arrow 62, onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a pressure roller 68. Sheet 58 passes between fuser roller 66 and pressure roller 68 with the toner powder image contacting fuser roller 66. In this manner, the toner powder image is permanently affixed to sheet 58. After fusing, a chute, not shown, guides the advancing sheet 58 to a catch tray, also not shown, for subsequent removal from the printing machine by the operator. It will also be appreciated that a finishing device (not shown) of a known type may be positioned between the fuser for collation and stapling or binding of the sheets. It will further be understood that the sheet 58 may be inverted and returned for duplex imaging by guides (not shown).

After the sheet of support material is separated from photoconductive surface of belt 10, the residual toner particles carried by the non-image areas on the photoconductive surface are charged to a suitable polarity and level by a preclean charging device 72 to enable removal therefrom. These particles are removed at cleaning station F. The vacuum assisted, electrostatic, fur brush cleaner unit 70 is disposed at the cleaner station F.

The cleaner unit has a fur brush roll that rotates at relatively high speeds which creates mechanical forces that tend to sweep the residual toner particles into an air stream (provided by a vacuum source (not shown)), and then into a cyclone separator (not shown) and a waste bottle arrangement (also not shown), as is well known in the art, in addition, the brushes are triboelectrically charged to a very high negative potential which enhances the attraction of the residual toner particles to the brushes and increases the cleaning performance. Subsequent to cleaning, a discharge lamp (not shown) floods the photoconductive surface with light to dissipate any residual electrostatic charge remaining prior to the charging thereof for the successive imaging cycle.

It is believed that the foregoing description is sufficient for purposes of the present application to illustrate the general operation of an electrophotographic printing machine incorporating the features of the present invention therein.

The operation of the present embodiment will now be explained in greater detail with continued reference to FIG. 1. Specifically, controller 100 which is preferably a microprocessor is, as is conventional, interconnected with the user interface panel 110, which provides for user interaction with the printing machine 1 through the controller 100; memory storage device 120 for storing and recalling information in a conventional manner; the voltage sources 45, 46, 47 and 48, which bias the developer housings; the image output terminal in this case ROS 26; which images the photoconductive surface by discharging portions thereof; and the corona generating device 25, which charges the photoconductive surface to a high potential.

First, the controller can generate a signal to the corona generating device to vary the charge level on the photoconductive surface so that the charge level prior to discharge by operation of the ROS is varied. The controller can also generate signals to vary the relative levels of the output of the ROS 26 generated in response to video signals from the ESS 27. In this manner, the discharge levels forming a latent image are affected. Moreover, the controller is connected to each of the power sources 45, 46, 47, and 48 in a manner to vary the bias levels on the developer housings 32, 33, 34 and 35, respectively. As will be recognized by those skilled in the art, variations in the charge level on the photoreceptive surface 12, variations in the intensity level of the discharge levels on the photoreceptive surface 12 from ROS 26, and variations in the bias levels, $V_{c1}$, $V_{c2}$, $V_{c3}$, and $V_{c4}$, of the developer housings 32, 33, 34, and 35, respectively, will effect the amount of toner material that is attracted to latent images formed on the conductive surface. The present invention seeks to take advantage of this.

Specifically, the user through the user interface panel 110 with selectors for varying one or more of these levels, can achieve customization of the various colors available. Further, by providing memory storage means 120, such as a magnetic disk device, for storing signals representing the selected levels of one or more of these levels, the user can repeatably achieve the customized color for a given input signal from the ESS 27. Further, as is known, sensing means can be employed to sense the changing characteristics in and about the device (e.g., as the photoreceptive surface 12 of the belt 10 ages and/or is used on a substantially continuous basis, its performance characteristics change) which can also compensate so that the performance of the device is enhanced.

Thus, in operation, a user would take a document for printing (e.g., an electronic data stream formatted for printing) on the machine and an image corresponding thereto print. By adjusting one or more of the levels of the forming means (i.e., the developer housing biases, the charge levels generated by the corona generator 25, and the discharge levels generated by the ROS 26), the colors of the document would be changed until a document having the desired color or colors thereon would be achieved.

Upon identification of desired colorations, signals representing the selected levels of charge on the photoconductive surface generated the corona generating device, levels of light intensity generated by the image output device (ROS 26) and levels of electrical bias applied by the voltage sources 45, 46, 47, and 48 to developer housings 32, 33, 34, and 35, respectively, would be stored in the memory device 120. The user would thus be enabled to repeat these colors at a remote time. Further, these values can be recalled, and, via a look-up table (LUT) or other conversion means which compensate for changing characteristics, such as the age of the photoreceptor, according to known means, to enable even more faithful reproduction of the selected colors.

This invention is particularly useful in that, for example, a specialized color is needed for letterhead of a particular company (hereinafter, for purposes of this example green). Thus, for this green, it requires parts of cyan and yellow together. The user would experiment with changing the various functions: levels (i.e., charge; discharge; and bias) until a combination matched the desired color. These signals presenting the selected combination would be stored together with a value for the relative age of the photoreceptor. Thereafter, recall of the signals representing the selected combinations would via adjustment by an adapted LUT be applied to the respective components so that desired green would be substantially recreated as selected.

It will be understood that the device can be used without the means for adjusting for age without substantial loss in the usefulness of this invention. It is also noted that not every one of the functions need to be changed or control of all functions enabled to practice the invention. In fact, the invention can be practiced by simply having control of either the developer bias voltages ($V_{c1}$, $V_{c2}$, $V_{c3}$ and $V_{c4}$ in the illustrative electrophotographic machine herein described) or the relative output levels of the image output device (ROS 26) herein.

It should also be recognized that the present invention is also useful and applicable in the practice of the invention described and disclosed in U.S. Pat. No. 4,903,048 incorporated herein by reference. In that patent, a process for arranging mutually exclusive pixels to form apparent colors in a two color highlight printer of the type to which this invention relates. The present invention would permit variations in the intensity of the pixels printed for separate colors to enable further apparent colors to be formed.

As a further example, to appreciate this invention assume the photoconductive belt 10 is initially charged to a voltage of approximately $-1,000$ volts ($V_b$), it may then be discharged by the five level ROS 26 to approximately $-800$ volts ($V_w$), to approximately $-450$ volts ($V_d$), to approximately $-275$ volts ($V_c$) and discharged to approximately $-100$ volts ($V_a$). The housings 32, 33, 34 and 35 may be biased, respectively, to approximately 250, 425, 600 and 850 volts, the bias, $V_{c1}$, $V_{c2}$, $V_{c3}$, and $V_{c4}$ being provided by the DC voltage biasing sources 45, 46, 47, and 48.

The following table present a representation of particular levels for or generated by the forming means to further illuminate and explain the invention.

| Developer Housing | Housing Bias | $V_b$ $-1000V$ | $V_a$ $-100V$ | $V_e$ $-275$ | $V_d$ $-450$ | $V_w$ $-800$ |
|---|---|---|---|---|---|---|
| 32 (magenta) | $-250$ V | No Dev | No Dev | No Dev | No Dev | No Dev |
| 33 (Cyan) | $-425$ V | No Dev | Dev | Dev | No Dev | No Dev |
| 34 (yellow) | $-600$ V | No Dev | Dev | Dev | Dev | No Dev |
| 35 (black) | $-850$ V | Dev | No Dev | No Dev | No Dev | No Dev |
| Resultant Color | | 35 | 32, 33 & 34 | 33 & 34 | 34 | substrate |

Figure 2:
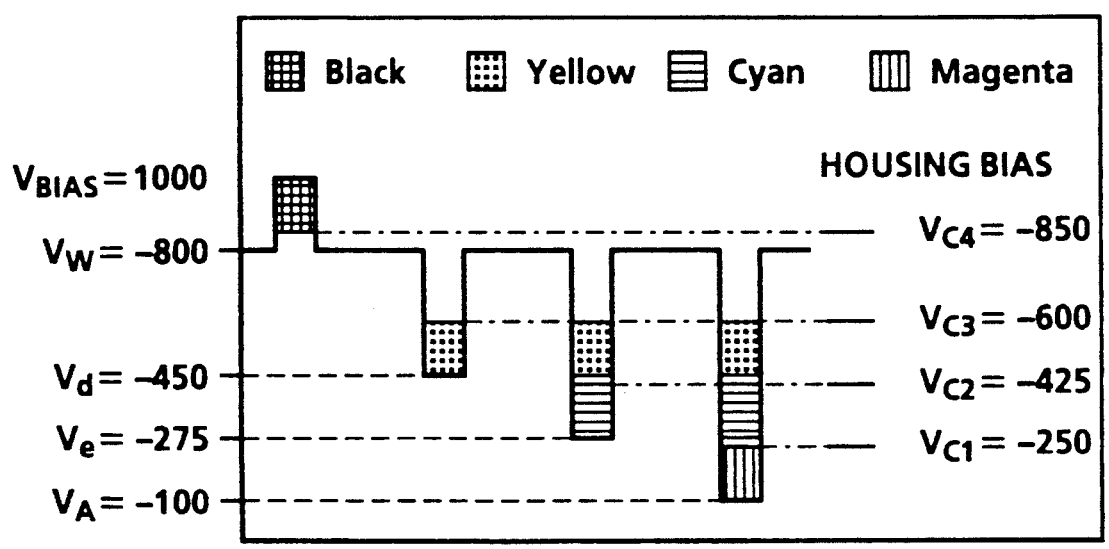
FIG. 2 is a graphic illustration representing base levels of the relative voltage values of the various areas of a charge pattern useful in practicing the present invention.

This table is also reflected graphically in FIG. 2

From a consideration of the above table, it can be seen that black toner is attracted to the $V_b$ voltage area and repelled from the other four charged areas, $V_a$, $V_e$, $V_d$, and $V_w$. This is because the $V_b$ areas of the photoreceptor are at a charge level of $-1,000$ volts while the bias on the developer housing 35 is at a $-850$ volts and the black developer is positively charged. Thus, in the present example, positively charged black developer is attracted to the photoreceptor areas which are more negative than the bias on the housing 35. Conversely, the black toner in the housing will be repelled from the photoreceptive areas that are more positive than the bias level applied to the housing 35.

Continuing with this example, it should also be obvious that the magenta toner will only be attracted to voltage levels at the level $V_a$. This is due to the voltage level $V_a$ being less negative than the bias on the developer housing 32 and the negative charge on the toner in that housing. The magenta toner is not attracted to the photoreceptor areas at the voltage levels, $V_e$ or higher, because these areas are more negative than the bias on the housing and the magenta toner is, therefore, repelled by these areas. Thus, in the example we have set forth the magenta toner housing 32 must precede the cyan toner housing 33 and yellow toner housing 34 to achieve a mixing of the toners applied to the area which is discharged to $V_a$. This is because the developer housing 33 and 34, in which the cyan and yellow toners are held, are biased so as to develop the charged level of the belt which are at a level of $V_a$ and $V_e$, and $V_a$, $V_e$, and $V_d$, respectively. Developing the less biased housing prior to the more biased housing which contain similarly charged toner (negative in this case), causes toner of a plurality of colors to be deposited in areas discharged to $V_a$ and $V_e$.

Thus, by changing the bias levels on the housing and the intensity of the laser in forming the component images of the composite latent image formed on the surface 12, the color of the developed image formed on the surface 12 would be changed. Thus, the user through the interface 110 can selectively choose the final colors of an image to be printed. For example, by increasing the output levels of the laser for various components of the latent image to be formed, in the given example, a different blend of the color toners is formed. Likewise, by changing the bias levels, it will also be appreciated that the levels of toner deposited on various portions of the composite image will be likewise affected. Further, in some cases, it may be desirable to disable or rearrange one or more of the housings to achieve a desired color. In any event, the user interface 110 is provided with selective apparatus which permits the user through the controller 100 to raise and lower the bias levels on one or more of the developer housings 32, 33, 34 and 35, as well as to effect the intensity of the imaging device 26. In this case, the controller is provided with the memory storage device 120, which permits the user to store selected bias levels and laser intensity levels so that particularly desired colors can be produced on a repeatable basis.

In recapitulation an electrophotographic printing machine of the type having a photoconductive surface on which a developed image is formed for producing a plural color image on a sheet substrate has been discussed and disclosed. The machine comprises mechanisms for forming a developed image on the photoconductive surface by attracting developer material of a plurality of colors to the photoconductive surface. The machine further provides apparatus for adjusting the forming mechanisms so as to change the quantity of at least one of the plurality of colored developer materials attracted to the photoconductive surface so that the quantity of the respective developer materials comprising the image produced on the substrate is varied. Finally, a device for storing and applying electronic signals corresponding to selected adjustments of the adjusting apparatus is provided so that selected colors are repeatable.

It is, therefore, apparent that there has been provided in accordance with the present invention, an electrophotographic printing machine that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. An electrophotographic printing machine of the type having a photoconductive surface on which a developed image is formed for producing a plural color image on a sheet substrate, comprising:

means for charging the photoconductive surface;

image generating means for exposing the charged portion of the photoconductive surface to record a latent image on the charged photoconductive surface;

image developing means for developing the latent image recorded on the photoconductive surface, said image developing means includes a plurality of developer units with each of said developer units having different color developer materials and each of said developer units being electrically biased to various levels;

adjusting means for adjusting in combination said charging means, said image generating means, and said image developing means so as to attract developer materials to the photoconductive surface in varying relative quantities from each of said plurality of developer units which produce the developed image thereby forming a developed image having a desired color; and means, responsive to said adjusting means, for storing electronic signals corresponding to selected adjustments of said adjusting means.

2. The printing machine of claim 1, wherein said adjusting means comprises a user interface responsive to user command signals for adjusting said adjusting means.

3. The printing machine of claim 1, wherein said image generating means comprises a raster output scanner for generating multiple output levels, said adjusting means being coupled to said raster output scanner, to adjust the relative output levels of said raster output scanner.

4. A method of printing sheets having user customized colors in an electrophotographic printing machine including a photoconductive member, comprising the steps of:

charging the photoconductive member;

recording a latent image on the photoconductive member;

developing the latent image recorded on the photoconductive surface with a plurality of developer units with each developer unit having different color developer materials and being electrically biased to various levels;

adjusting in combination said charging step, said recording step, and said developing step so as to change the quantities of developer material attracted to the photoconductive member to vary the color of the image produced on the sheets;

storing electronic signals corresponding to selected adjustments made to the developer units in said adjusting step; and applying subsequently selected signals stored in said storing step to the developer units so that selected colors are replicable.

5. The method of claim 4, wherein said recording step comprises imaging the photoconductive member with a raster output scanner having plural output levels to form a plural level latent image and wherein said adjusting step comprises varying the relative output levels of the raster output scanner.

* * * * *